W. M. POST.
INTERMEDIATE SUPPORT FOR BOND WIRES AND NUT LOCKS.
APPLICATION FILED JAN. 19, 1912.
1,089,787.
Patented Mar. 10, 1914.
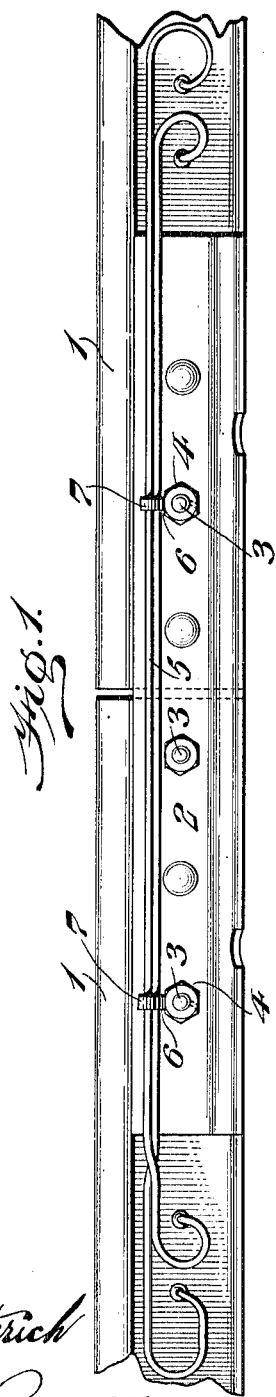
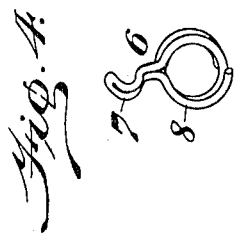
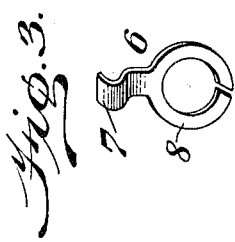
WITNESSES
INVENTOR
Welles M. Post.
BY Wiedersheim & Fairbanks,
ATTORNEYS

UNITED STATES PATENT OFFICE.

WELLES M. POST, OF ELIZABETH, NEW JERSEY.

INTERMEDIATE SUPPORT FOR BOND-WIRES AND NUT-LOCKS.

1,089,787. Specification of Letters Patent. Patented Mar. 10, 1914.

Original application filed March 24, 1909, Serial No. 485,431. Divided and this application filed January 19, 1912. Serial No. 672,190.

*To all whom it may concern:*

Be it known that I, WELLES M. POST, a citizen of the United States, residing in the city of Elizabeth, county of Union, State of New Jersey, have invented a new and useful Intermediate Support for Bond-Wires and Nut-Locks, of which the following is a specification.

My invention consists of a combined intermediate support for bond-wires and nut-lock.

This application is a division of the application, Serial No. 485,431, filed by me on March 24th, 1909, for intermediate supporting clip for bond wires.

The annexed drawings and the following description set forth in detail mechanical forms embodying the invention, such detail construction being but one of various mechanical forms in which the principle of the invention may be used.

In said annexed drawings—Figure 1 represents a side elevation of a rail-joint with bond-wires, illustrating the application of my improved device. Figs. 2, 3 and 4 represent perspective views of three forms of my device embodying my invention.

Similar numerals of reference indicate corresponding parts in the figures.

Referring to the drawings, the reference numeral 1 indicates the ends of two rails connected by fish-plates or splice bars, 2, through which pass bolts, 3, having nuts, 4. Bonding-wires, 5, have their ends secured in the rails in the usual or any approved manner, bridging the joint between the rails. The bond-wires are supported along the sides of the rail-ends and fish-plates by clips, 6, having curved tongues, 7, forming the wire-retaining portions, and split washer-portions, 8, forming the nut-engaging elements. The washer-portions are clamped between the nuts and the face of the fish-plate, and serve by their resiliency to bind the threads of the nuts against the threads of the bolts, and the free ends of the split washer-portions also engage the inner faces of the nuts, preventing the same from turning upon the bolts.

In the form illustrated in Fig. 2, the clip is formed from flat spring-metal shaped to form an annular washer, split at the curved tongue.

In the form illustrated in Fig. 3, the clip is likewise formed from flat spring-metal shaped to form an annular washer, but the split in the same is at a point diametrically opposite the curved tongue.

In the form illustrated in Fig. 4, the clip is formed from a piece of wire doubled upon itself, and the doubled portion of the wire forms the curved tongue, while the ends of the wire are bent into circular form to constitute the annular washer with the free ends located at opposite sides of the same.

In either form of clip, the washer-portion is slipped upon a bolt of the rail-joint and the bond-wire placed within the curved tongue, whereupon the nut is screwed home upon the bolt and is held from turning upon the same by the split washer-portion.

Other modes of applying the principle of my invention may be employed for the mode herein explained. Change may therefore be made as regards the mechanism thus disclosed, providing the principles of construction set forth, respectively, in the following claims are employed.

Having thus described my invention, what I claim as new and desire to secure by Letters Patent, is:—

1. A combined nut-locking and wire-retaining washer formed of a single piece of spring-metal having a curved wire-retaining portion and a nut engaging element.

2. A combined nut-locking and wire-retaining device comprising a flat spring-metal split washer forming a nut engaging element and a curved wire-retaining tongue.

3. A combined nut-locking and wire-retaining device formed of a single piece of spring-metal having a curved wire-retaining portion provided with a bearing terminal extending in one direction and a nut-engaging element extending in another direction from the washer.

4. In a rail-joint, the combination with the rails, splice bars, bolt and bond-wires; of a nut-locking and wire-retaining device consisting of a spring-metal washer having an integral outwardly bent device for holding the nut and an integral oppositely bent portion for retaining the bond wires.

WELLES M. POST.

Witnesses:
S. A. MOREAU,
JAS. E. FOSTER.

Copies of this patent may be obtained for five cents each, by addressing the "Commissioner of Patents, Washington, D. C."